(12) United States Patent
Koiwa et al.

(10) Patent No.: US 6,217,096 B1
(45) Date of Patent: Apr. 17, 2001

(54) PASSENGER COMPARTMENT SEALING STRUCTURE FOR AUTOMOBILE

(75) Inventors: Takeshi Koiwa; Tetsuya Gomi; Yasuto Shigematsu; Kazuyuki Kumakura; Kazue Tashiro, all of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/325,812

(22) Filed: Jun. 4, 1999

(30) Foreign Application Priority Data

Jun. 4, 1998 (JP) .................................................. 10-155917

(51) Int. Cl.$^7$ ....................................................... B60R 5/04
(52) U.S. Cl. ............................. 296/24.1; 296/66; 296/69; 296/65.09
(58) Field of Search ............................. 296/26.01, 190.1, 296/190.11, 201, 200, 37.16, 66, 65.05, 69, 147, 146.16, 85, 89, 84.1, 180.1, 65.01, 65.09; 297/219.1

(56) References Cited

U.S. PATENT DOCUMENTS

| | | | |
|---|---|---|---|
| 2,632,668 | * 3/1953 | Keller | 296/85 |
| 3,214,211 | * 10/1965 | Setina | 296/85 X |
| 5,605,368 | * 2/1997 | Noma et al. | 296/69 X |
| 5,702,143 | * 12/1997 | Shimazaki | 296/37.16 X |

FOREIGN PATENT DOCUMENTS

| | | |
|---|---|---|
| 885344 | 4/1996 | (JP) . |
| 986245 | 3/1997 | (JP) . |

\* cited by examiner

*Primary Examiner*—D. Glenn Dayoan
*Assistant Examiner*—Jason Morrow
(74) *Attorney, Agent, or Firm*—Carrier, Blackman & Associates, P.C.; Joseph P. Carrier; William D. Blackman

(57) ABSTRACT

A passenger compartment sealing structure for an automobile includes a rear seat selectively movable between a seating position and non-seating, erected position, and a partition such as a window glass provided with the rear seat, the partition being movable relative to the rear seat when in its erected position so as to sealingly abut with a lower surface of the roof of the automobile. When the rear seat 3 is folded down to a position where it overlaps the back of front seats 2L, 2R, a large volume of luggage receiving space 6 is formed rearward of the rear seat 3 so folded down. When the rear seat is folded down and erected and the window glass 7 is raised so as to come into abutment with a lower side of a rear roof 5, the capacity of the luggage receiving space 6 can be increased to thereby receive therein a large-sized piece of luggage L or many pieces of luggage L and moreover, the passenger compartment 1 can tightly be closed to thereby prevent the penetration thereinto of rain, dust, noise, running wind, odor or the like. In addition, when the rear seat 3 is deployed for use, it is possible to increase the number of passengers.

14 Claims, 6 Drawing Sheets

PASSENGER COMPARTMENT SEALING STRUCTURE FOR AUTOMOBILE

BACKGROUND OF THE INVENTION

1. Field of the Invention

The present invention relates to an automobile including front seats, a foldable rear seat disposed rearward of the front seats and a luggage receiving space disposed rearward of the rear seat, and more particularly to a passenger compartment sealing structure for such an automobile.

2. Description of the Related Art

It is known from the official gazettes of Japanese Unexamined Patent (Kokai) Publication Nos. Hei. 8-85344 and Hei. 9-86245 that in an automobile having front seats and a rear seat, when the rear seat is folded down to a position just behind the back of the front seat backs, a large volume of luggage receiving space is created rearward of the rear seat so folded down. With a foldable rear seat like this, it is possible, as required, to deploy the rear seat so that passengers can be seated thereon or to fold it down to receive a large-sized piece of luggage, thus improving the convenience to the user of such a vehicle.

Now, in an automobile constructed in such a manner as described above, if a fixed bulkhead is provided between a passenger compartment and a luggage receiving space, the bulkhead separates a luggage receiving space created when the rear seat is folded down from the existing luggage receiving space rearward of the rear seat, and this causes a problem that the luggage receiving space so created helps in no way to contain large-sized luggage in the interior of the vehicle. Further, without any bulkhead provided between the luggage receiving space made open to the outside of the vehicle and the passenger compartment, there is caused a problem that road dust and/or rain reaches the interior of the passenger compartment, or the odor of an article received in the luggage receiving space penetrates the interior of the passenger compartment.

SUMMARY OF THE INVENTION

The present invention was made in these circumstances, and an object thereof is to reconcile a loading capacity for large-sized luggage and a tight closing capability for a passenger compartment in an automobile provided with a luggage receiving space rearward of a foldable rear seat.

In order to attain the aforementioned goal, a passenger compartment sealing structure for an automobile comprises a front seat disposed in a passenger compartment, a foldable rear seat disposed rearward of the front seat and a luggage receiving space disposed rearward of the rear seat. The rear seat is provided with a partition such as a window glass that can be raised and lowered when the rear seat is folded down so as to be positioned just behind the back of the front seat. The passenger compartment is separated from the luggage receiving space by raising the partition into abutment with a lower side of a roof.

According to the above construction, the number of passengers can be increased by deploying the foldable rear seat in a seating position, while the luggage receiving space can be expanded so as to receive large-sized luggage by folding the foldable rear seat toward the front seat. In addition, not only is it possible to tightly close the passenger compartment so as to prevent the penetration thereinto of rain, dust, noise, running wind, odor or the like but also to enhance the air-conditioning efficiency by raising the partition from the folded rear seat so as to bring it into abutment with the lower side of the roof.

In addition, the rear seat may comprise a seat cushion constructed so as to be selectively erected around a front edge portion thereof and a seat back constructed so as to overlap the front of the seat cushion so erected, and the partition is raised and lowered through an opening formed in an upper side of the seat cushion so erected.

According to the above construction, since the seat back overlaps the front of the erected seat cushion, the rear seat can be folded compact, and moreover, since the partition is provided with the seat cushion in the interior thereof, there is no need of a special space for receiving the partition therein, thereby making it possible to utilize the space effectively.

DETAILED DESCRIPTION OF THE PREFERRED EMBODIMENT

Figure 1:
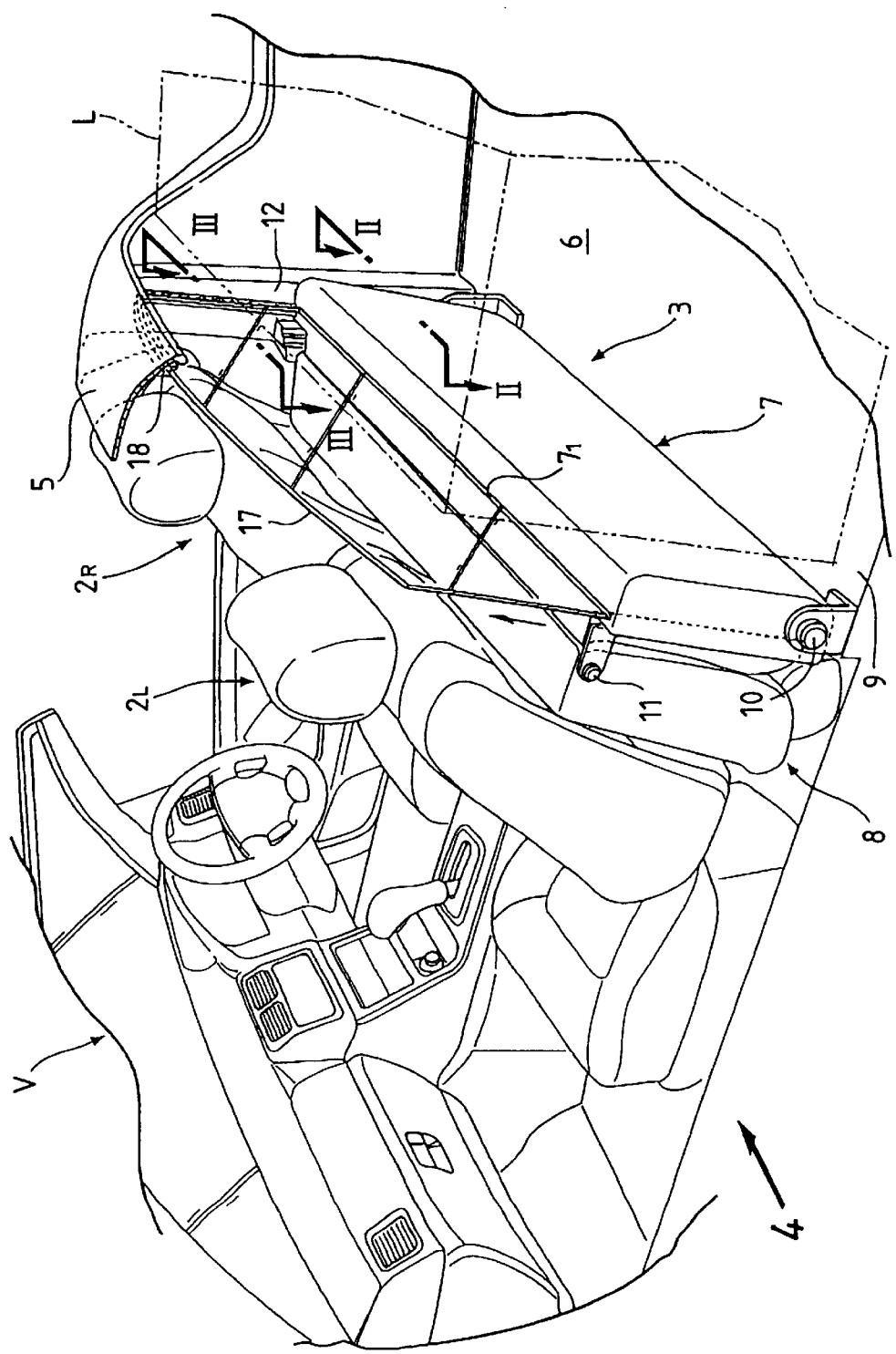
FIG. 1 is a perspective view of a main part of an automobile; including a passenger compartment sealing structure according to the preferred embodiment of the present invention.

A mode of operation of the present invention will be described based on an embodiment of the present invention shown in the accompanying drawings.

As shown in FIGS. 1 to 4, in a passenger compartment 1 of an automobile V, there are provided separate-type front seats $2_L$, $2_R$, which are separately disposed left and right, and a bench-type rear seat 3 is disposed rearward of the front seats $2_L$, $2_R$. An upper part of the passenger compartment 1 is covered with a detachable front roof 4 (refer to FIG. 4), and a fixed rear roof 5 is provided rearward of this front roof 4. Provided rearward of the rear roof 5 is a luggage receiving space 6 which can be made open at an upper side thereof.

Figure 4:
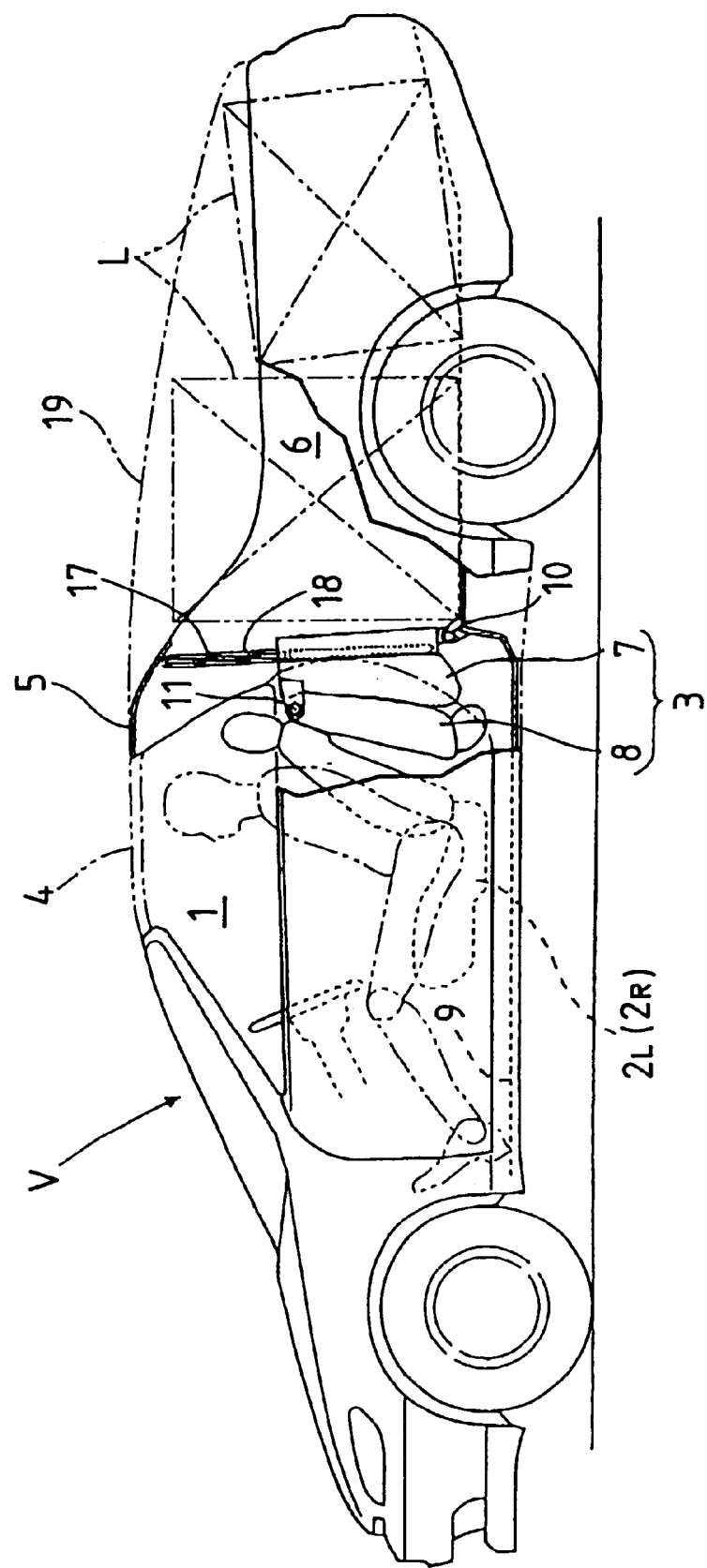
FIG. 4 is a side view of a vehicle body including the passenger compartment sealing structure according to the preferred embodiment of the invention, with some external structure omitted for understanding; showing a rear seat which is not in use.

The rear seat 3 includes a seat cushion 7 and a seat back 8. The seat cushion 7 is pivotably supported at a front end thereof by hinge pins 10, 10 provided on a floor 9, while the seat back 8 is pivotably supported on an opposite end of the seat cushion 7 by hinge pins 11, 11. When the rear seat 3 is folded down about hinge pins 11, 11, the seat cushion 7 and the seat back 8 are brought to overlap each other, and they may then be erected about hinge pins 9, 9 so that the seat back 8 is positioned just behind the back of the front seats $2_L$, $2_R$ as shown in FIGS. 1 and 4.

Figure 2:
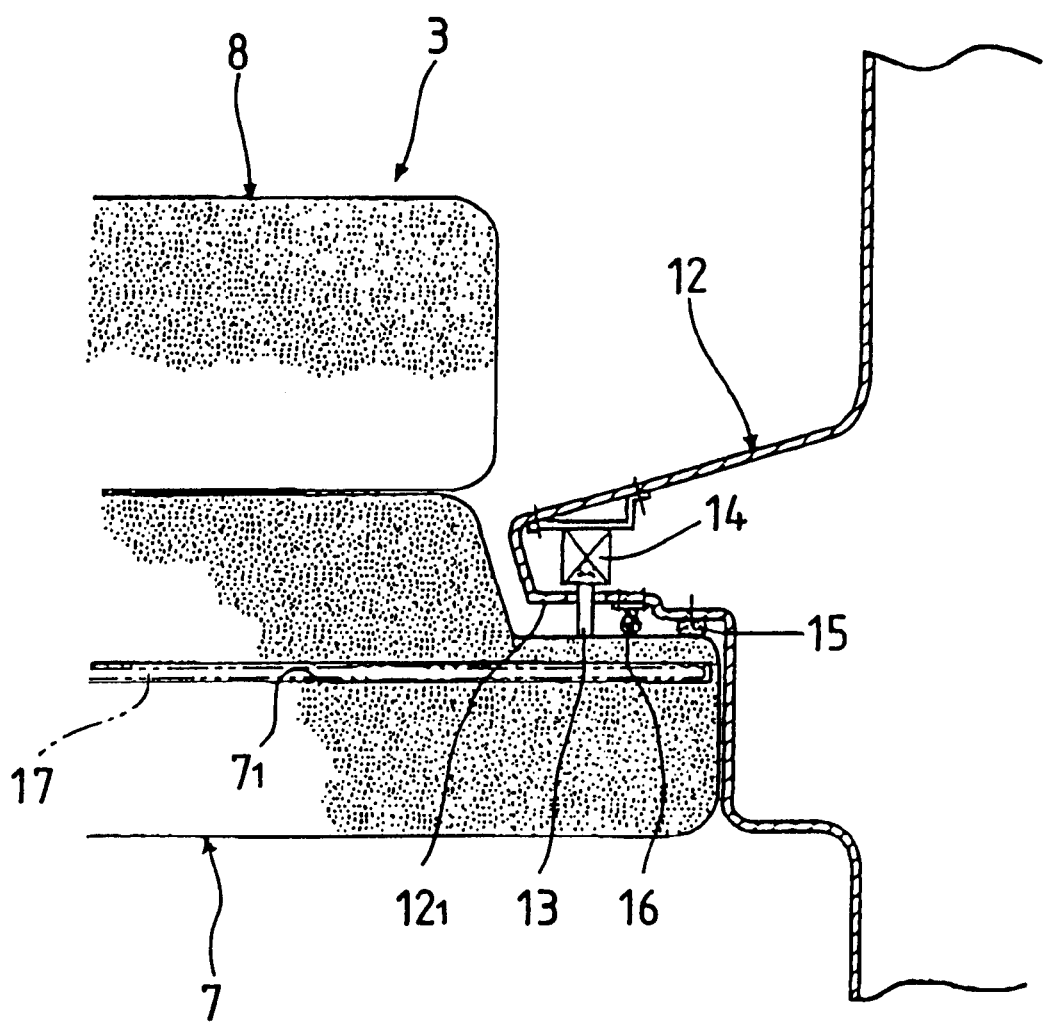
FIG. 2 is an enlarged sectional view taken along line II—II of FIG. 1.
Figure 3:
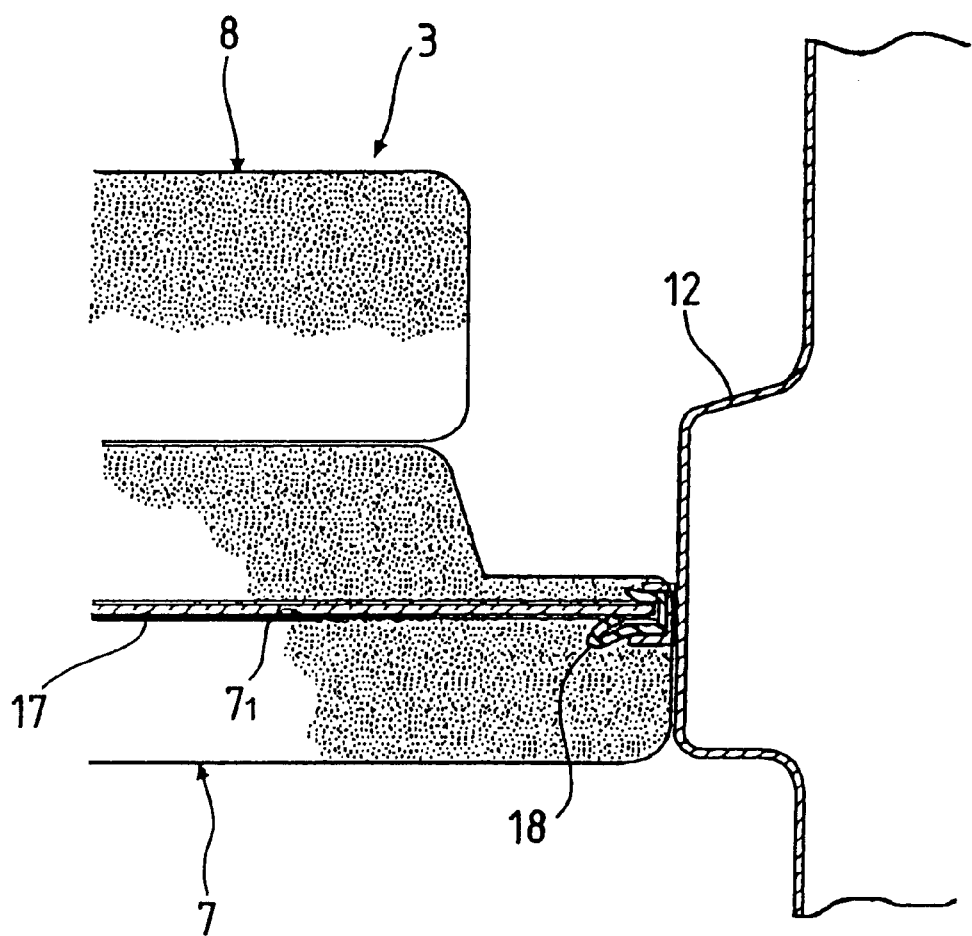
FIG. 3 is an enlarged sectional view taken along line III—III of FIG. 1.

As is clear from FIG. 2, a stepped portion $12_1$, is formed on the side of a center pillar 12 and a hook 13 provided on the front of the erected seat cushion 7 is engaged with a locking means 14 provided on the stepped portion $12_1$. At this position, a stopper 15 and a seal member 16 provided on the stepped portion $12_1$ on the side of the center pillar 12 are brought into abutment with the front of the seat cushion 7.

An opening $7_1$ is formed in the back of the seat cushion 7 (i.e., in an upper side of the seat cushion in its erected state)

of the rear seat 3 in such a manner as to extend laterally of the vehicle body. A partition, preferably such as a transparent window glass 17 received in the interior of the seat cushion 7 is driven so as to be raised and lowered through the opening $7_1$ by a driving source (not shown). The window glass 17 raised from the seat cushion 7 then fits in a seal member 18 having a groove-like cross section which is fixed to the sides of the center pillar 12 and a lower side of the rear roof 5 (refer to FIGS. 1 and 3). Hence, the partition achieves a sealing property in the passenger compartment 1 of the automobile.

A function of the present invention constructed as described above will be described below.

When there is caused a need to load a large-sized piece of luggage L in the vehicle, as shown in FIG. 4, the rear seat 3 is folded down and then erected so as to be positioned just behind the back of the front seats $2_L$, $2_R$. As a result of this, the capacity of the luggage receiving space 6 is increased, and this makes it possible to load therein the large-sized piece of luggage L or many pieces of luggage L. When the rear seat 3 is folded down and erected, the seat cushion 7 thereof is brought into abutment with the seal member 16 provided on the stepped portion $12_1$, of the center pillar 12 to thereby effect sealing (refer to FIG. 2). In addition, when the window glass 17 is raised from the opening $7_1$ in the seat cushion 7, an upper edge of the window glass 17 fits in the seal member 18 provided on the lower side of the rear roof 5 and the sides of the center pillar 12 to thereby effect sealing (refer to FIGS. 1 and 3). Thus, if the window glass 17 is raised as required, the passenger compartment 1 can completely be separated from the luggage receiving space 6, whereby not only is it possible to prevent the penetration into the passenger compartment 1 of rain, dust, noise, running wind, odor of luggage received therein or the like, but also to enhance the efficiency of air-conditioning.

Figure 5:
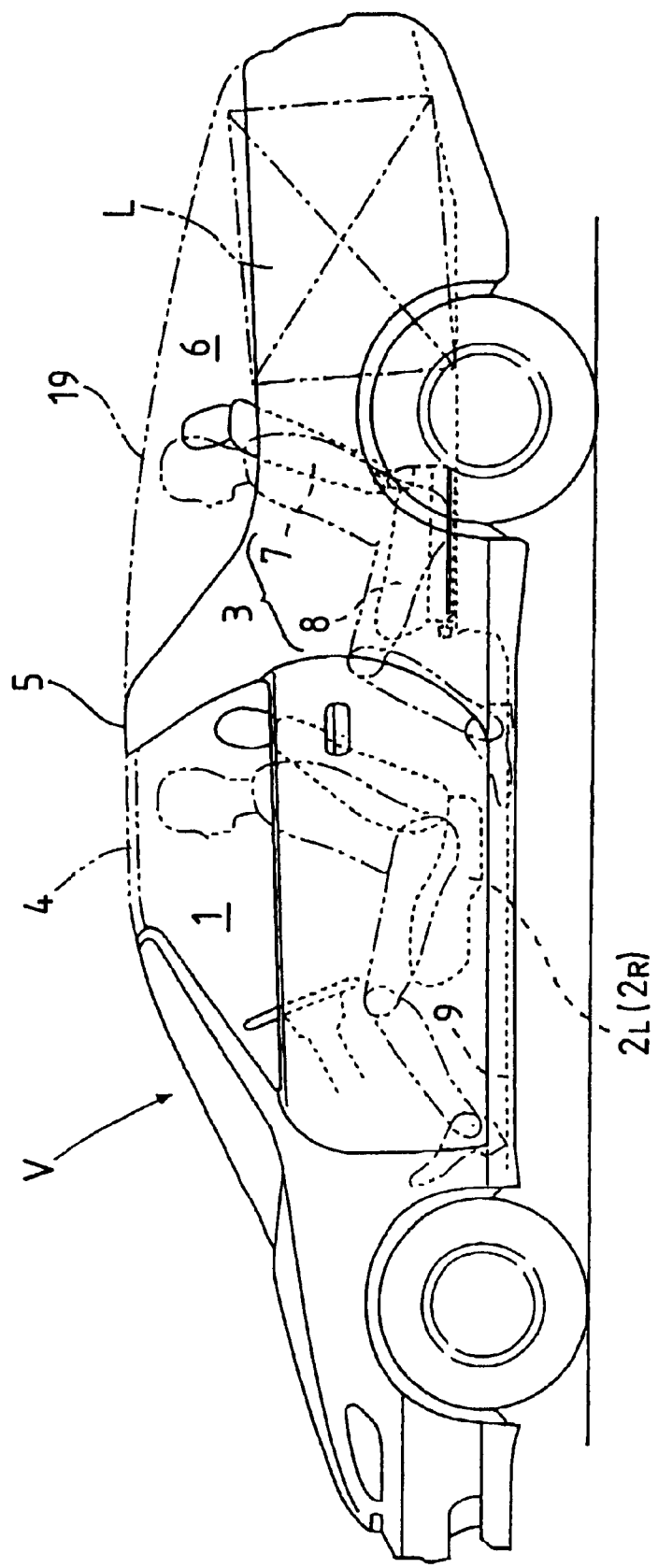
FIG. 5 is a side view of the vehicle body similar to FIG. 4, but showing the rear seat which is in use.
Figure 6A:
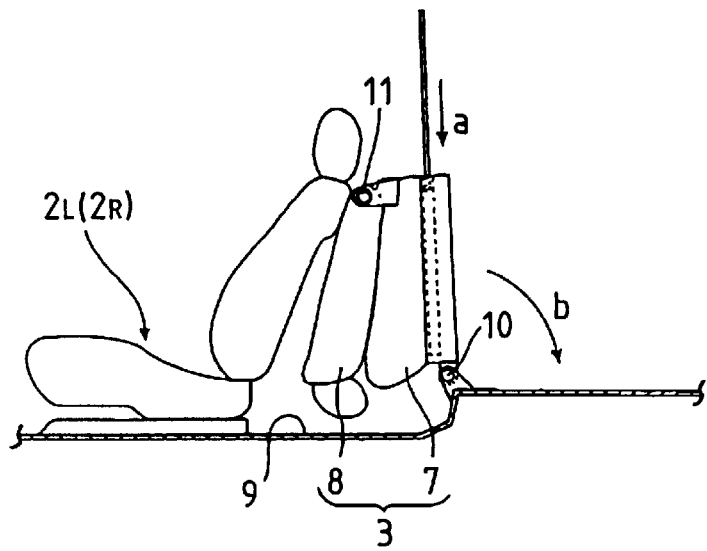
FIGS. 6A to 6C are explanatory views describing a function of the present invention.
Figure 6B:
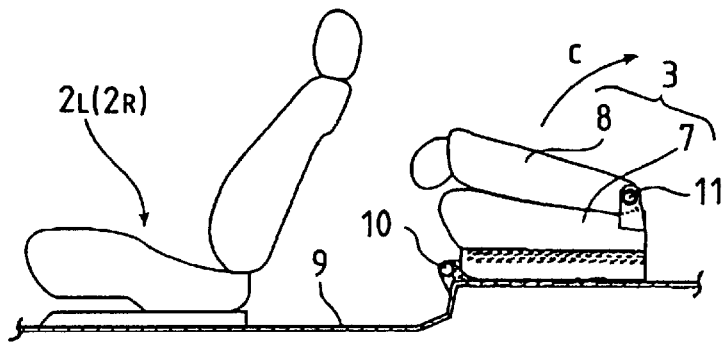
Figure 6C:
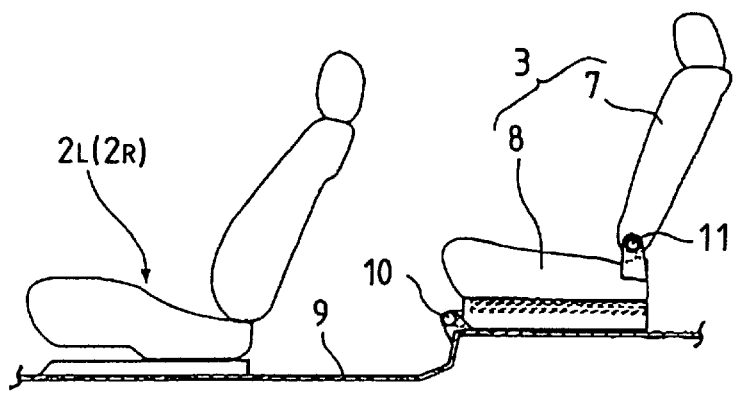

In order to use the rear seat 3, as shown in FIG. 6A, the window glass 17 is retracted into the interior of the seat cushion 7 of the erected rear seat 3 in a direction indicated by an arrow (a). Then, the seat cushion 7 is rotated together with the seat back 8 around the hinge pins 10, 10 in a direction indicated by an arrow (b). Further, as shown in FIG. 6B, when the seat back 8 is rotated around the hinge pins 11 in a direction indicated by an arrow (c), as shown in FIGS. 5 and 6C, the rear seat 3 becomes available for passengers, thereby making it possible to increase the riding capacity. In this case, apiece of luggage L can be received using the luggage receiving space 6 existing behind the rear seat 3.

Although the preferred embodiment of the present invention has been described heretofore, various modifications in design can be made thereto without departing from the spirit and scope of the present invention.

For instance, although the upper part of the luggage receiving space 6 of the automobile V in the above embodiment is made open, as shown in FIGS. 4 and 5, a roof 19 may be provided at the upper part of the luggage receiving space 6. Therefore, in a case where a piece of luggage L emitting a certain odor is loaded in the luggage receiving space 6, the penetration of such an odor into the passenger compartment 1 can be prevented by raising the window glass 17, and in addition, with the window glass 17 so raised, it is possible to air-condition only the passenger compartment 1, thereby making it possible to enhance the efficiency of air-conditioning.

As has been described heretofore, according to the invention, the number of passengers containable in the automobile can be increased by deploying the foldable rear seat, alternatively while a large-sized piece of luggage can be received in the luggage receiving space by increasing the capacity thereof by folding the foldable rear seat. In addition, the passenger compartment 1 can tightly be closed by raising the window glass from the folded rear seat so as to come into abutment with the lower side of the roof, thereby not only preventing the penetration thereinto of rain, dust, noise, running wind, odor or the like but also enhancing the efficiency of airconditioning.

In addition, since the seat back of the rear seat is constructed so as to overlap the front of the erected seat cushion, the rear seat can be folded compact, and moreover, since the window glass is stored in the interior of the seat cushion, there is no need of a special space for storing therein the window glass, thereby making it possible to effectively utilize the space provided.

The present disclosure relates to the subject matter contained in Japanese patent application No. 10-155917 filed on Jun. 4, 1998.

What is claimed is:

1. A passenger compartment sealing structure for an automobile comprising:

a front seat disposed within a passenger compartment;

a foldable rear seat disposed rearward of said front seat; and a luggage receiving section defined rearward of said rear seat, wherein said rear seat is provided with a partition being movable up and down when said rear seat is folded down as to be positioned just behind the back of said front seat, said passenger compartment is separated from said luggage receiving section by raising said partition into abutment with a lower side of a roof, and said partition achieving a sealing property in said passenger compartment.

2. A passenger compartment sealing structure for an automobile comprising:

a front seat disposed within a passenger compartment;

a foldable rear seat disposed rearward of said front seat; and a luggage receiving section defined rearward of said rear seat, wherein said rear seat is provided with a partition being movable up and down when said rear seat is folded down as to be positioned just behind the back of said front seat, and said passenger compartment is separated from said luggage receiving section by raising said partition into abutment with a lower side of a roof, and said rear seat comprises a seat cushion constructed so as to be selectively erected around a front edge portion thereof and a seat back constructed so as to overlap the front of said erected seat cushion, and said partition is moved up and down through an opening formed in an upper side of said erected seat cushion.

3. A passenger compartment sealing structure for an automobile comprising:

a body defining a roof;

a front seat mounted on said body;

a rear seat foldably mounted on said body rearward of said front seat; and a window glass received in said rear seat, said window glass being movable up and down so as to abut with a lower surface of said roof when said rear seat is folded toward the front seat.

4. A passenger compartment sealing structure for an automobile according to claim 3, wherein the rear seat comprises:
   a seat cushion mounted on said body at a from edge portion thereof and being selectively erectable around the front edge portion thereof; and
   a seat back pivotally connected to said seat cushion and overlapping the front of said seat cushion when said seat cushion is erected, and
   wherein one of said seat cushion and seat back has an opening which receives said window glass.

5. A passenger compartment sealing structure for an automobile according to claim 3, wherein said window glass has a width substantially equal to that between center pillars of said body.

6. A passenger compartment sealing structure for an automobile comprising:
   a front seat disposed within a passenger compartment;
   a foldable rear seat disposed rearward of said front seat; and
   a luggage receiving section defined rearward of said rear seat,
   wherein said rear seat is provided with a partition being movable up and down when said rear seat is folded down as to be positioned just behind the back of said front seat, and said passenger compartment is separated from said luggage receiving section by raising said partition into abutment with a lower side of a roof, and
   said partition is a window glass.

7. A passenger compartment sealing structure for an automobile comprising:
   a front seat disposed within a passenger compartment;
   a foldable rear seat disposed rearward of said front seat;
   a luggage receiving section defined rearward of said rear seat,
   wherein said rear seat is provided with a partition being movable up and down when said rear seat is folded down as to be positioned just behind the back of said front seat, and said passenger compartment is separated from said luggage receiving section by raising said partition into abutment with a lower side of a roof; and
   a seal provided on the lower side of the roof for sealingly engaging an edge of the partition when the partition abuts the lower side of the roof.

8. A passenger compartment sealing structure for an automobile according to claim 7, wherein said seal is also provided on sides of center pillars of the automobile for sealingly engaging side edges of said partition when the partition abuts the lower side of the roof.

9. A passenger compartment sealing structure for an automobile comprising:
   a front seat disposed within a passenger compartment;
   a foldable rear seat disposed rearward of said front seat; and
   a luggage receiving section defined rearward of said rear seat,
   wherein said rear seat is provided with a partition being movable up and down when said rear seat is folded down as to be positioned just behind the back of said front seat, and said passenger compartment is separated from said luggage receiving section by raising said partition into abutment with a lower side of a roof, and
   said partition is selectively disposable within the rear seat.

10. A passenger compartment sealing structure for an automobile according to claim 2, wherein said partition is selectively, fully disposable within the seat cushion.

11. A passenger compartment sealing structure for an automobile according to claim 3, further including a seal provided on the lower side of the roof for sealingly engaging an edge of the window glass when the window glass abuts the lower side of the roof.

12. A passenger compartment sealing structure for an automobile according to claim 11, wherein said seal is also provided on sides of center pillars of said body for sealingly engaging side edges of said widow glass when the partition abuts the lower side of the roof.

13. A passenger compartment sealing structure for an automobile according to claim 3, wherein said partition is selectively, fully disposable within the rear seat.

14. A passenger compartment sealing structure for an automobile according to claim 4, wherein said partition is selectively, fully disposable within the seat cushion.

* * * * *

UNITED STATES PATENT AND TRADEMARK OFFICE
CERTIFICATE OF CORRECTION

PATENT NO. : 6,217,096 B1
DATED : April 17, 2001
INVENTOR(S) : T. Koiwa et al.

It is certified that error appears in the above-identified patent and that said Letters Patent is hereby corrected as shown below:

Column 2,
Line 17, after "automobile" delete the semicolon;
Line 19, after "invention" change the period to a semicolon;
Line 28, after "understanding" change the semicolon to a comma.

Column 3,
Line numbered between 23 and 24, after "$12_1$" delete the comma;
Line numbered between 46 and 47, change "apiece" to -- a piece --.

Column 4,
Line 2, change "alternately while" to -- while alternately --;
Line 10, change "airconditioning" to -- air-conditioning --.

Column 5,
Line 4, change "from" to -- front --.

Column 6,
Line 34, change "widow" to -- window --.

Signed and Sealed this

Fifteenth Day of April, 2003

JAMES E. ROGAN
*Director of the United States Patent and Trademark Office*